United States Patent
Hu et al.

(10) Patent No.: US 8,284,705 B2
(45) Date of Patent: Oct. 9, 2012

(54) METHODS AND SYSTEMS FOR RECOVERING FROM AN INCOMPLETE IDLE MODE ENTRY

(75) Inventors: Fangqi Hu, San Diego, CA (US);
Kuo-Chun Lee, San Diego, CA (US);
Guangming Shi, San Diego, CA (US);
Tom Chin, San Diego, CA (US);
Patrick Lim, San Diego, CA (US);
Steven Cheng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 654 days.

(21) Appl. No.: 12/543,032

(22) Filed: Aug. 18, 2009

(65) Prior Publication Data

US 2011/0045849 A1 Feb. 24, 2011

(51) Int. Cl.
*H04B 7/00* (2006.01)
(52) U.S. Cl. ......... 370/310; 370/311; 455/458; 455/574
(58) Field of Classification Search .................. 370/311; 455/458, 574
See application file for complete search history.

(56) References Cited

U.S. PATENT DOCUMENTS

2006/0154663 A1 7/2006 Son et al.

OTHER PUBLICATIONS

P802.16Rev2/D6 "Draft Standard for Local and Metropolitan area networks, Part 16: Air Interface for Broadband Wireless Access Systems" Jul. 2008.*
Marks, L80216-09_0508 "Liason Statement to IEEE 802.16 WG on modifications to the IEEE 802.16 standard needed to support WiMAX certification" May 22, 2009.*
Jan et al., IEEE C80216m-09/1254, "Comments on AWD Idle Mode", Jul. 6, 2009.*
Kang et al., C80216m-09_1470r1, "Clarification of Idle mode initiation procedure (AWD-15.2.17.1)", Jul. 14, 2009.*
Anonymous: "TWG Inter-Operability Problem Reports (IOPRs 41111, 41164, 41762)" IEEE L802.16-09/0058 [online] May 22, 2009, pp. 1-8, XP002609620 Retrieved from the Internet: URL:http://wirelessman.org/liaison/docs/L8 0216-09_0058.doc> [retrieved on Nov. 11, 2010] p. 3-p. 5.
International Search Report and Written Opinion—PCT/US2010/044529—International Search Authority, European Patent Office,Dec. 17, 2010.

* cited by examiner

*Primary Examiner* — Huy D Vu
*Assistant Examiner* — Joseph Bednash
(74) *Attorney, Agent, or Firm* — Charles Chesney

(57) ABSTRACT

This application provides techniques for a mobile station (MS) to determine whether a base station (BS) successfully receives a response to a BS request for the MS to enter an idle mode.

20 Claims, 8 Drawing Sheets

METHODS AND SYSTEMS FOR RECOVERING FROM AN INCOMPLETE IDLE MODE ENTRY

TECHNICAL FIELD

Certain embodiments of the present disclosure generally relate to wireless communication and, more particularly, to recovering from an incomplete idle mode entry.

SUMMARY

Certain embodiments of the present disclosure provide a method for wireless communications. The method generally includes receiving a request from a base station (BS) to enter idle mode, sending a response to the BS indicating acceptance of the request to enter idle mode, sending a location update request to the BS to confirm successful receipt of the response by the BS, and determining if the response indicating acceptance of the request to enter idle mode was successfully received by the BS, based on a response to the location update request sent by the BS or a lack of response to the location update request sent by the BS.

Certain embodiments of the present disclosure provide an apparatus for wireless communications. The apparatus generally includes logic for receiving a request from a base station (BS) to enter idle mode, logic for sending a response to the BS indicating acceptance of the request to enter idle mode, logic for sending a location update request to the BS to confirm successful receipt of the response by the BS, and logic for determining if the response indicating acceptance of the request to enter idle mode was successfully received by the BS, based on a response to the location update request sent by the BS or a lack of response to the location update request sent by the BS.

Certain embodiments of the present disclosure provide an apparatus for wireless communications. The apparatus generally includes means for receiving a request from a base station (BS) to enter idle mode, means for sending a response to the BS indicating acceptance of the request to enter idle mode, means for sending a location update request to the BS to confirm successful receipt of the response by the BS, and means for determining if the response indicating acceptance of the request to enter idle mode was successfully received by the BS, based on a response to the location update request sent by the BS or a lack of response to the location update request sent by the BS.

Certain embodiments of the present disclosure provide a computer-program product for wireless communications, comprising a computer readable medium having instructions stored thereon, the instructions being executable by one or more processors. The instructions generally including instructions for receiving a request from a base station (BS) to enter idle mode, instructions for sending a response to the BS indicating acceptance of the request to enter idle mode, instructions for sending a location update request to the BS to confirm successful receipt of the response by the BS, and instructions for determining if the response indicating acceptance of the request to enter idle mode was successfully received by the BS, based on a response to the location update request sent by the BS or a lack of response to the location update request sent by the BS

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
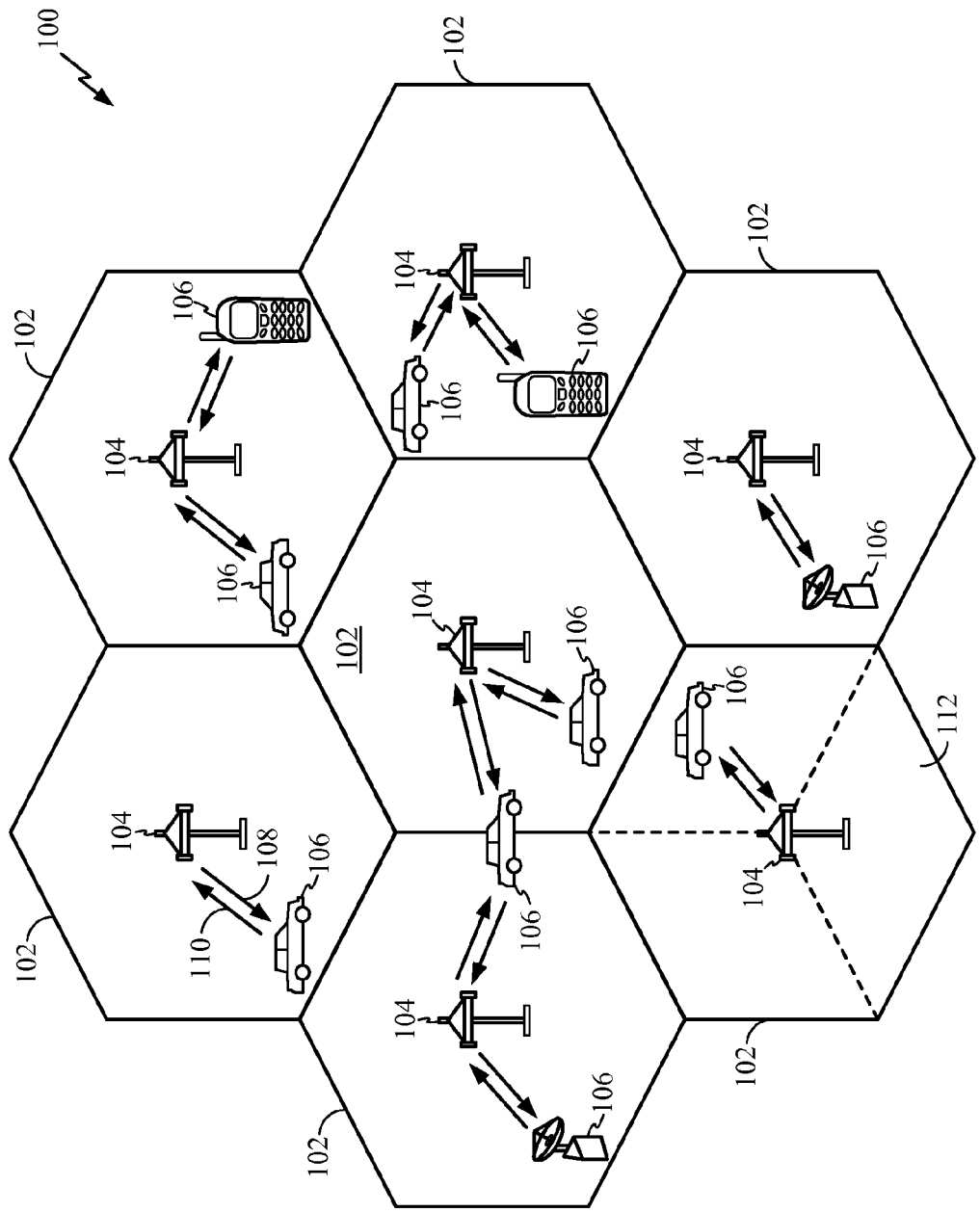
FIG. 1 illustrates an example wireless communication system, in accordance with certain embodiments of the present disclosure.

Orthogonal frequency-division multiplexing (OFDM) and orthogonal frequency division multiple access (OFDMA) wireless communication systems, such as those compliant with the IEEE 802.16 family of standards, typically use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MS).

When there is minimal or no traffic from/to an MS for a given period, the MS may enter idle mode in an effort to conserve operational resources. Idle mode entry of an MS may be initiated by the MS itself or by a BS currently serving the MS. During idle mode, the serving BS may transmit a page message in an effort to notify the MS of pending downlink (DL) data. The MS may periodically enter a listening interval to receive the page message.

Unfortunately, with the existing procedure the BS and MS may become out of sync. For example, the MS may send a response to a command from the BS to enter idle. In some cases, the BS may not receive the response, but the MS may enter idle anyway. The BS may re-transmit a request for the MS to enter idle but, having already entered idle, the MS may not respond. Thus, the BS may release the MS's context. The consequence is that the MS may function as if it is still on the system, for example, periodically listening to the BS, while the BS no longer has the context of the MS.

Embodiments of the present disclosure may provide techniques that may enable a mobile station (MS) to proactively avoid a loss of synchronization between the MS and a currently serving base station (BS) during an idle mode entry procedure. After receiving and responding to an idle mode request from the BS, the MS may transmit a location update request to the BS. The MS may detect a potential loss of synchronization during idle mode based on whether the BS successfully received the MS's response to the idle mode request, which may be determined from the BS's response to the location update request.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
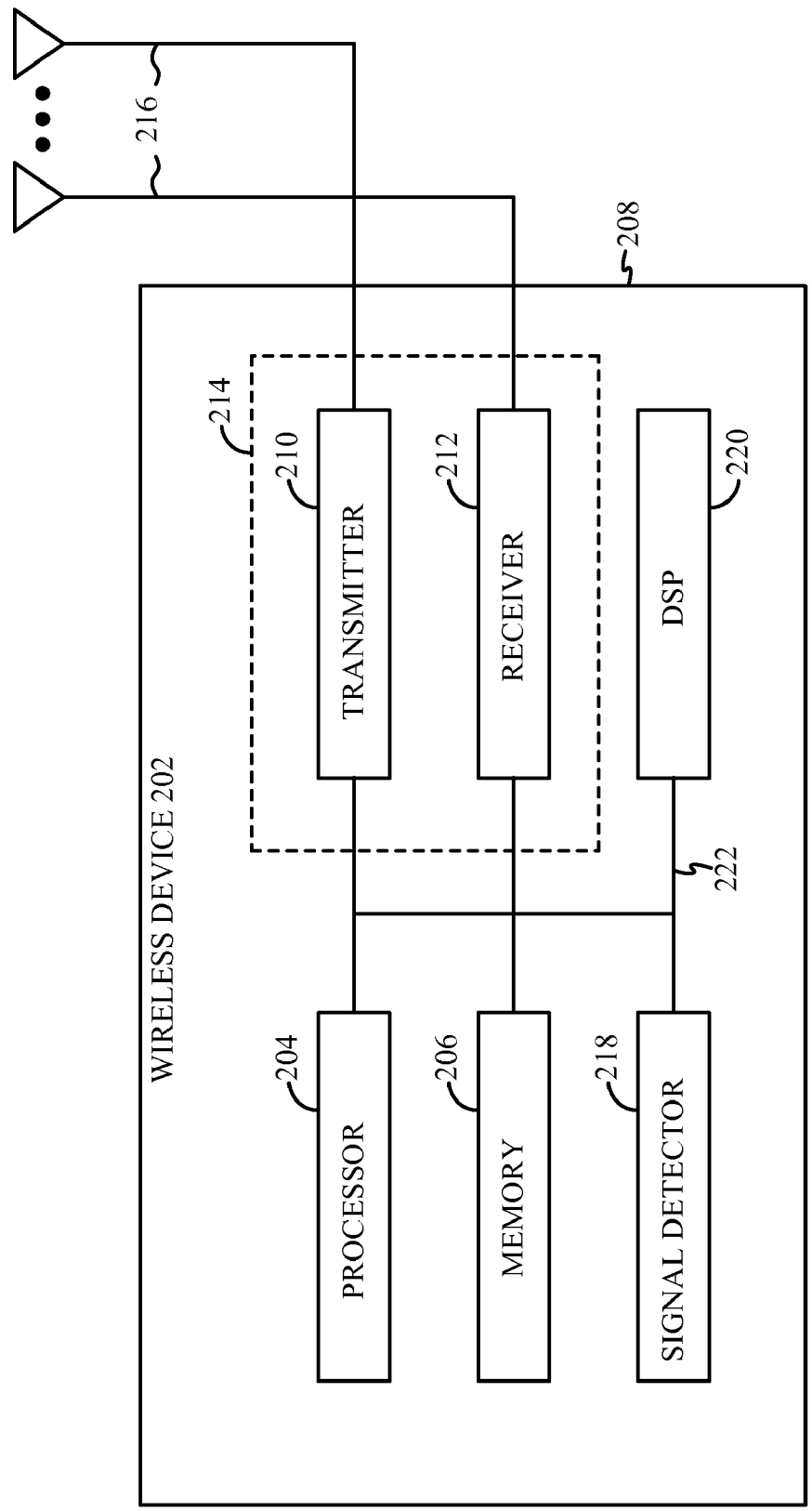
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
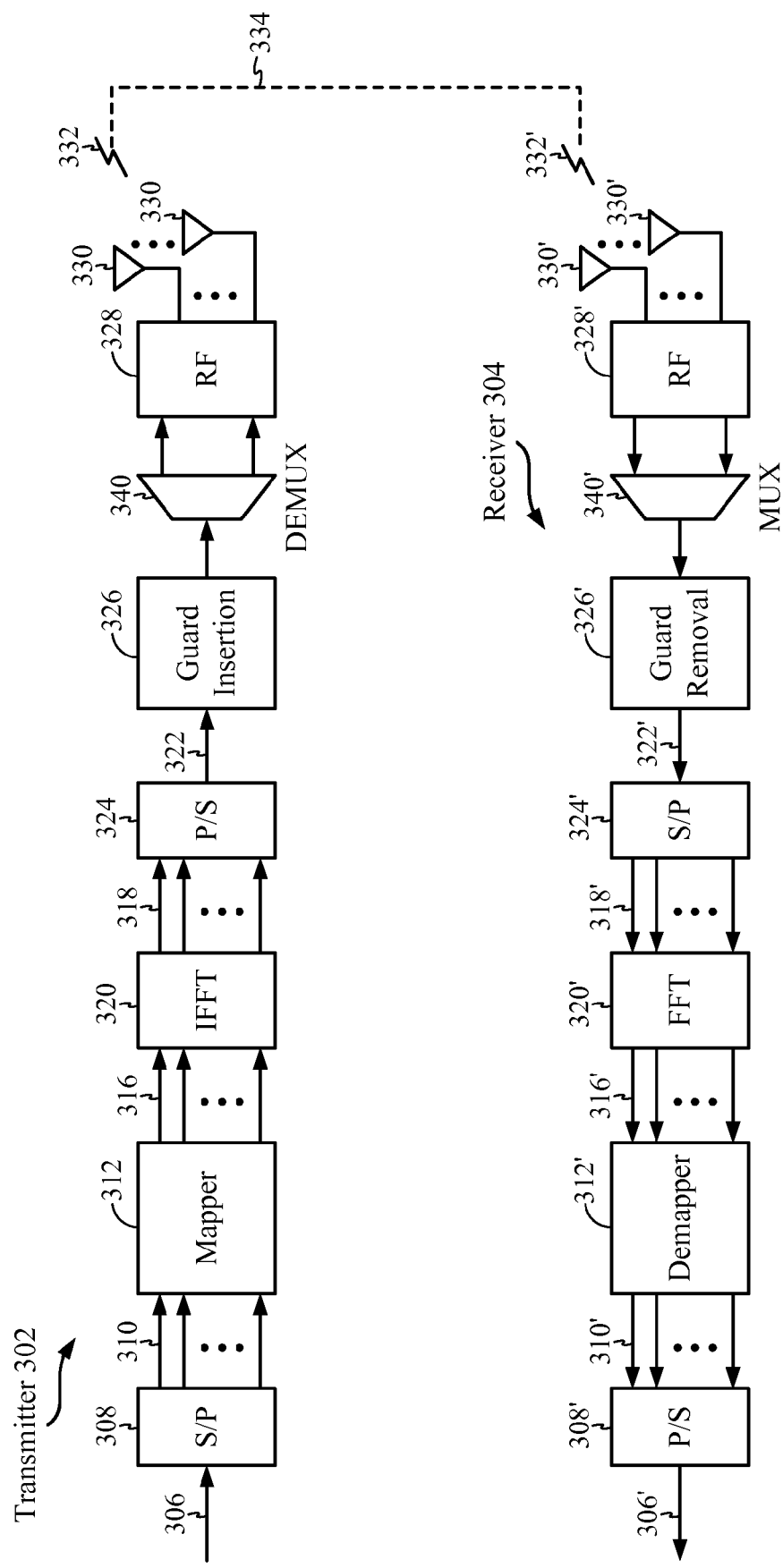
FIG. 3 illustrates an example transmitter and an example in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary BS-Initiated Procedure for Entering Idle Mode

Figure 4:
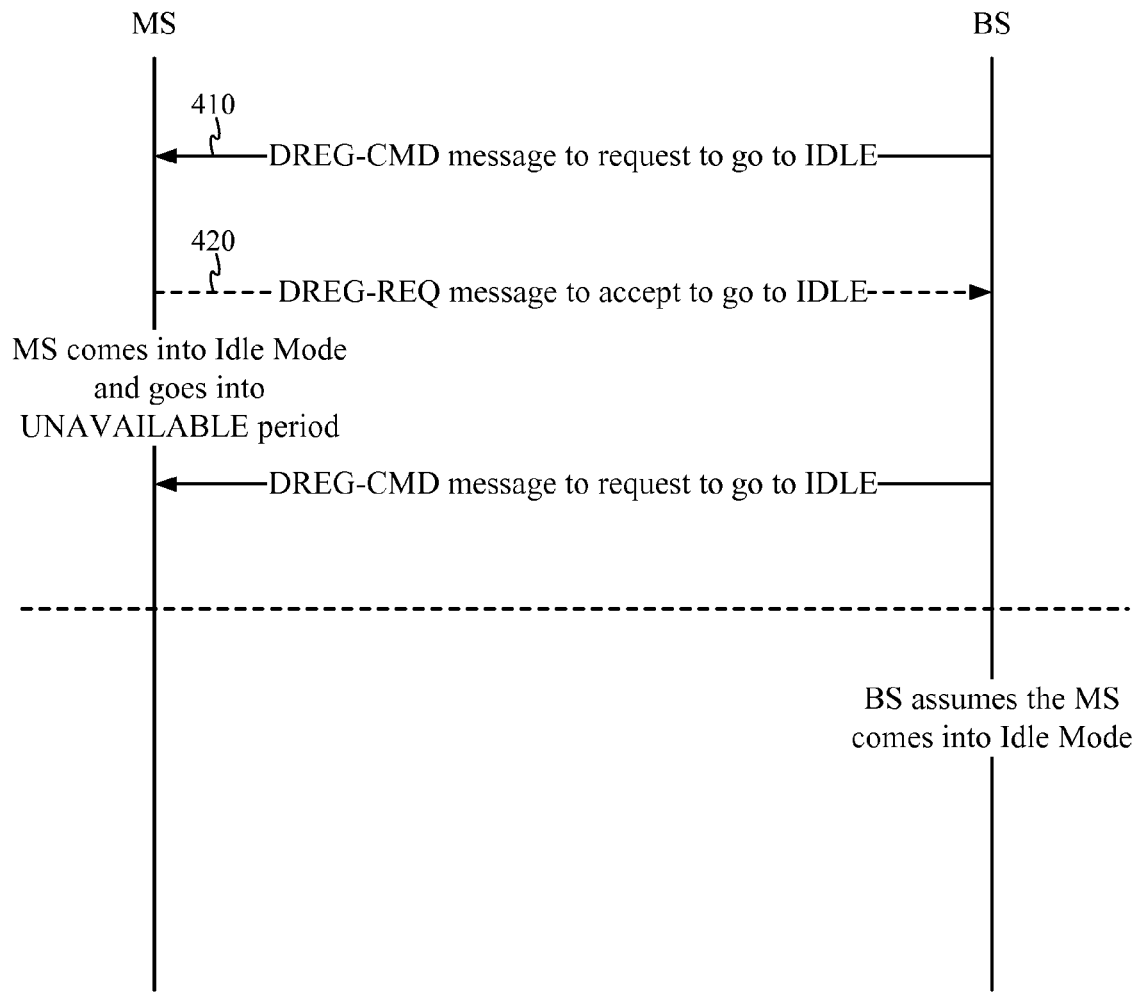
FIG. 4 illustrates a base station (BS)-initiated procedure for entering idle mode, in accordance with certain embodiments of the present disclosure.

FIG. 4 illustrates a conventional BS-initiated procedure for entering idle mode. When a serving BS realizes that there is minimal or no traffic from/to a MS, the BS may prompt the MS to enter idle mode by sending an unsolicited De/Re-register command (DREG-CMD) message 410 as shown in the figure. The MS, upon receiving the DREG-CMD message 410, may respond by sending to the BS, a De-registration Request (DREG-REQ) message 420 to indicate deregistration from the BS. After sending the message 420, the MS may enter idle mode. The BS may become aware of the MS's idle mode entry from the message 420 and may retain information about the MS (context) in order to be able to perform operations, such as notifying the MS of pending traffic or facilitating network reentry. As described earlier, the MS may, at regular intervals, wake up and scan for a page message periodically sent by the BS. Following the scanning, the MS, aided by the BS, may reenter the network for resuming normal operation and/or attending to pending DL traffic.

Successful completion of the idle mode entry procedure may depend on the BS successfully receiving the DREG-REQ message 420. If the BS does not receive the message 420, a loss of synchronization may occur between the MS and the BS.

Figure 5:
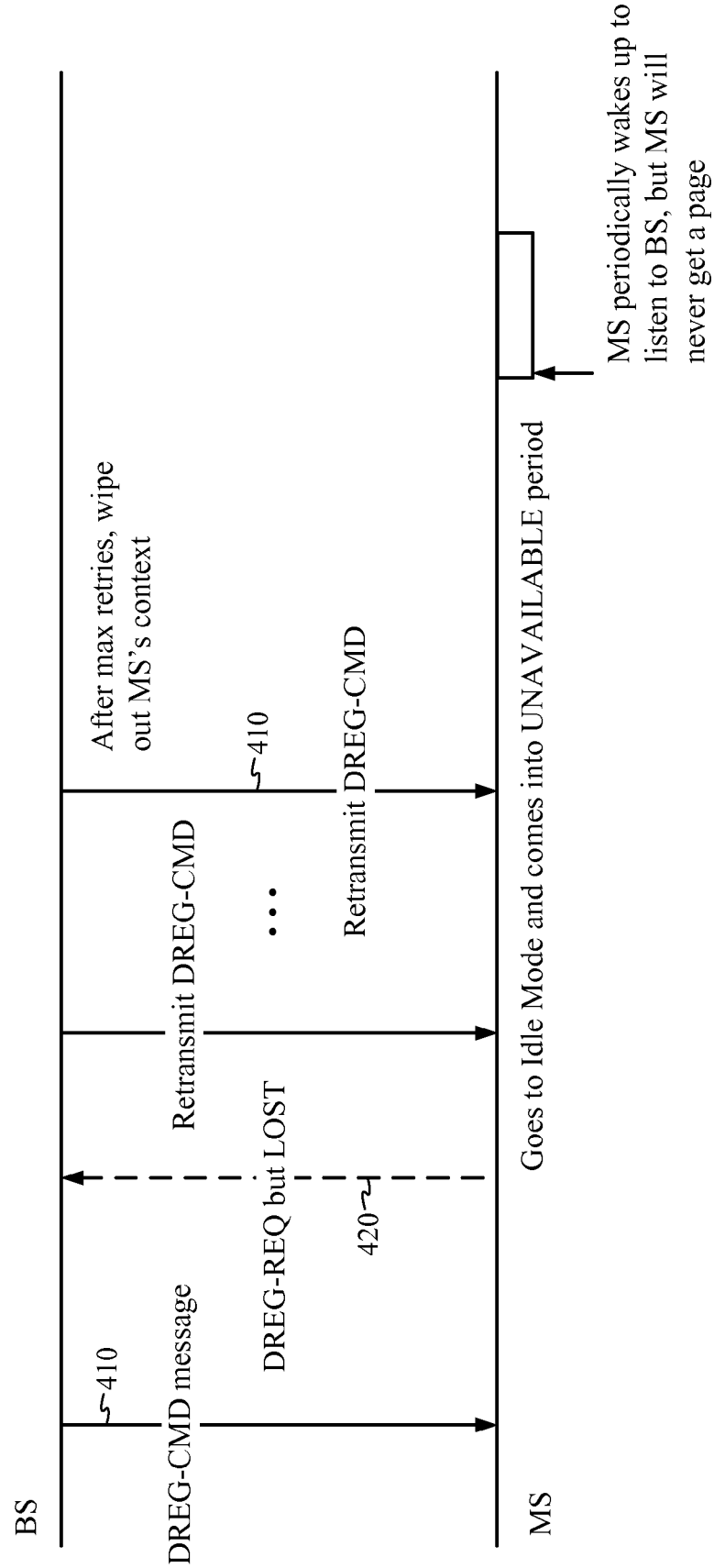
FIG. 5 illustrates loss of synchronization between a BS and a mobile station (MS) during idle mode, in accordance with certain embodiments of the present disclosure.

FIG. 5 illustrates this loss of synchronization situation. After sending the DREG-CMD message 410, the BS may start a timer in an effort to determine when retransmission of the message 410 may be desired. The timer may be restarted every time the message 410 is sent. The MS may respond to the message 410 by sending the DREG-REQ message 420 and then enter idle mode, assuming that the BS will eventually receive the message 420. However, in the illustrated example, the message 420 is lost during transmission (e.g., due to reasons such as transmission errors). If the BS does not receive the DREG-REQ message 420 (e.g., before a timer expires), the BS may request the MS to enter idle mode again by retransmitting the DREG-CMD message 410. The MS, now in idle mode, may not be able to receive the message 410 and therefore, may never retransmit the DREG-REQ message 420. The BS may repeatedly retransmit the message 410 until a maximum retry limit is reached.

Once the maximum retry limit is reached, the BS may stop further retransmissions of the message 410 and drop context (information) about the MS. The information thus dropped may include the information that may be used for sending the page message to the MS. The MS, unaware of the situation, may wake up periodically to scan for the page message, which the BS may never transmit. This may cause a loss of synchronization between the MS and the BS.

Certain embodiments of the present disclosure, however, provide techniques that may help determine whether the BS has successfully received the response sent by the MS indicating the MS's acceptance to enter idle mode, before the MS enters idle mode. Doing so may help prevent or at least minimize loss of synchronization between the BS and the MS while the MS is in idle mode.

Figure 6:
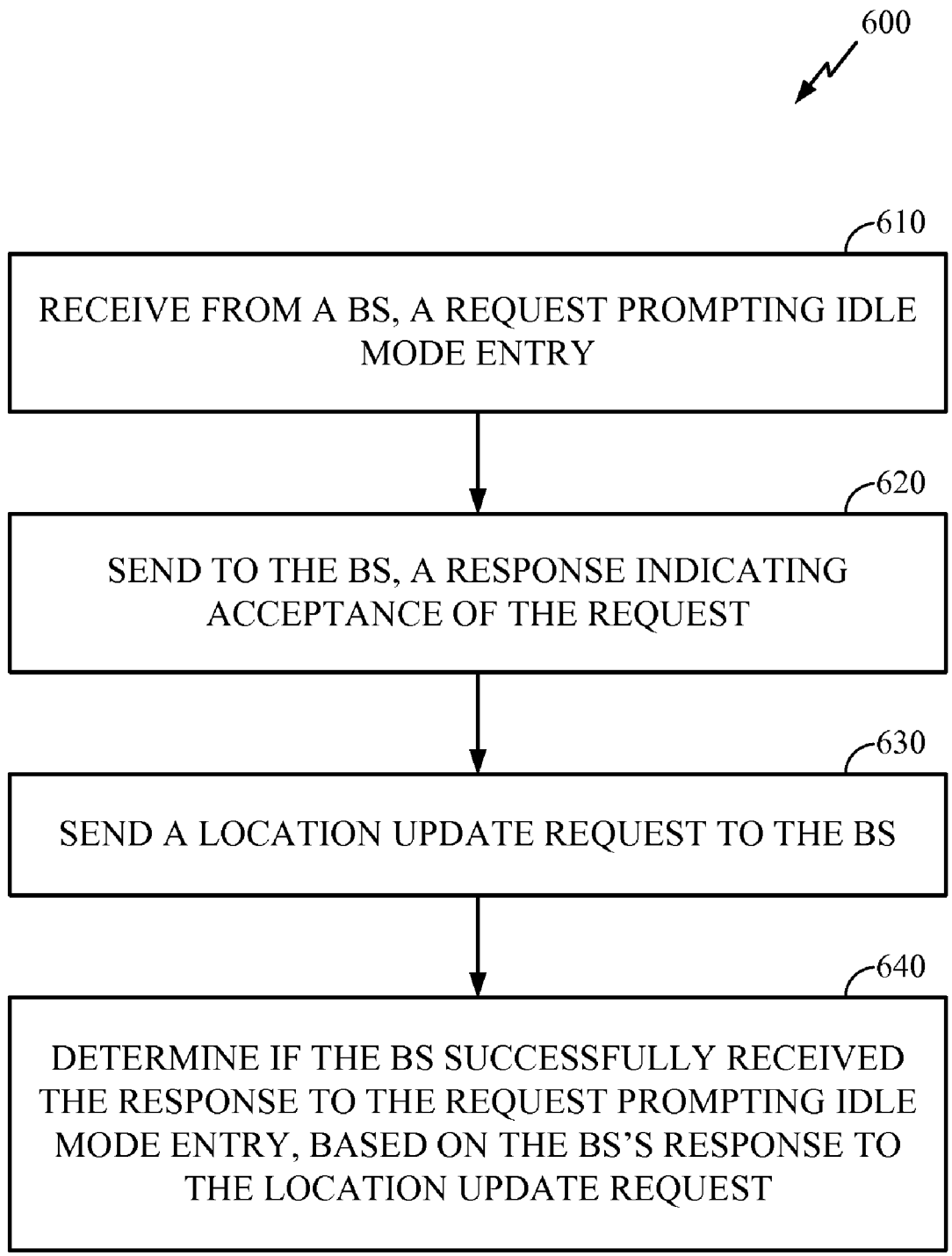
FIG. 6 illustrates example operations for determining whether a BS successfully received response to an idle mode request, in accordance with certain embodiments of the present disclosure.

Exemplary Determination if BS Received Response to a Request Prompting Idle Entry FIG. 6 illustrates example operations 600 that may be performed by an MS for determining whether a BS received an MS response to an idle mode request, in accordance with certain embodiments of the present disclosure.

At 610, the MS may receive from a BS currently serving the MS, a request prompting the MS to enter idle mode. Such an idle mode request may be in the form of a DREG-CMD message 410 as illustrated in FIG. 5. At 620, the MS may send to the BS, a response indicating the MS's acceptance of the request. The response may be in the form of a DREG-REQ message 420 as illustrated in FIG. 5.

After responding to the idle mode request, the MS may not immediately enter idle mode as in a conventional procedure for entering idle mode. Instead, the MS may first determine whether the BS successfully received the MS's response to the idle mode request sent by the BS.

For example, the MS may confirm receipt by performing a location update procedure. To initiate the location update procedure, the MS may send a location update request to the BS at 630. A MS may typically send a location update request to a BS so that the BS may update information related to the location of the MS for future communication with the MS. However, in embodiments of the present disclosure, following up the response to the BS's idle mode request with a location update request may help the MS determine the whether the BS successfully received the response as described below.

At 640, the MS may determine whether the BS successfully received the response to the idle mode request, based on the BS's response to the location update request. The BS's response to the location update request may depend on the status of the response sent by the MS to the idle mode request.

For instance, if the BS did not successfully receive the response to the idle mode request, due to transmission errors or other reasons, the BS may simply drop the location update request even if the request is successfully received. The MS, not receiving a response to the location update request until a previously set timer expires, may retransmit the location update and restart the timer. Regardless of the number of retransmissions, the BS may never respond to the location update request since the BS did not successfully receive the MS's response to the idle mode request.

The MS may continue to retransmit the location update request until a maximum limit is reached. Once the limit is reached, the MS may conclude that the BS did not successfully receive the response to the idle mode request, and therefore conclude that entering idle mode may cause loss of synchronization between the MS and the BS. The MS may choose to resolve the situation by repeating operations 620 through 640 in an effort to confirm that the BS will be aware when the MS enters idle mode.

On the other hand, if the BS successfully received the response sent at 620, the BS may use the information in the location update request to update the information about the location of the MS and send a location update response indicating whether the update was successful. The location update response, regardless of whether the update was successful, may act as a confirmation for the MS that the BS received the response to the idle mode request sent by the BS. The MS may then enter idle mode and scan periodically for page messages as described earlier. In certain embodiments of the present disclosure, if the location update response indicates that the location update was not successful, the MS may choose to repeat the location update procedure until the location update is successful, prior to entering idle mode.

Figure 7:
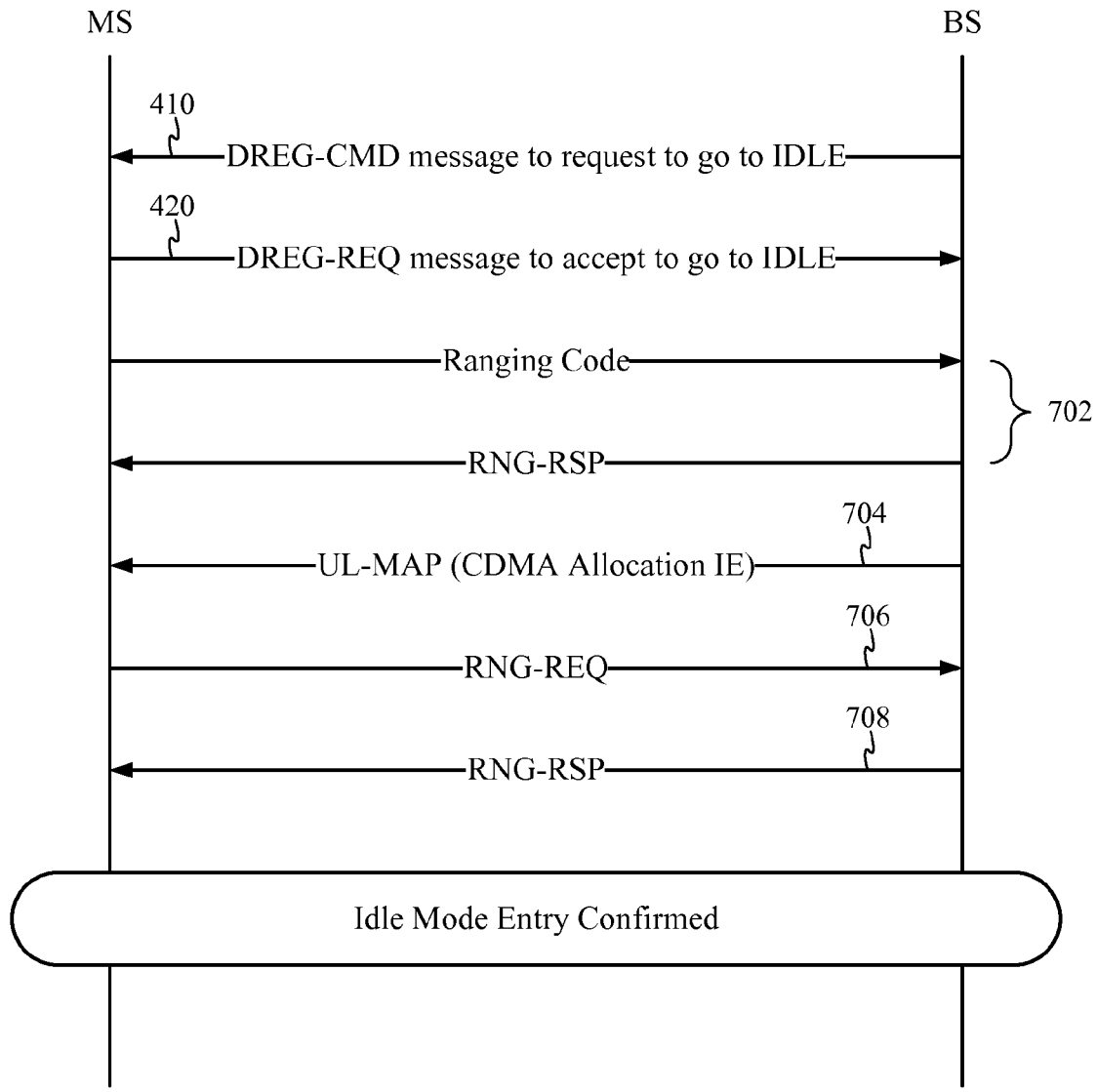
FIG. 7 illustrates an example call flow for determining whether a BS successfully received response to an idle mode request, in accordance with certain embodiments of the present disclosure.

FIG. 7 illustrates an example call flow 700 for determining whether a BS successfully received response to an idle mode request based on a location update request sent to the BS via a Ranging Request (RNG-REQ) message from a MS. As described earlier, the BS may request the MS to enter idle mode by sending a DREG-CMD message 410. The MS may respond to the message 410 by sending a DREG-REQ message 420 to indicate to the BS that the MS is willing to enter idle mode.

Following the DREG-REQ message 420, the MS may initiate a location update procedure by sending a location update request. As described earlier, the BS's response to the location update request may be important in determining whether the BS received the DREG-REQ message 420. Therefore, it may be desirable to increase the likelihood of the BS successfully receiving the location update request so that the BS may send a suitable response.

To accomplish this, prior to sending a location update request, the MS may perform ranging with the BS at 702. To perform ranging, the MS may send a randomly chosen ranging code to which the BS may respond by sending a Ranging Response (RNG-RSP) message with adjustments for timing, transmit power etc. The BS may then allocate uplink resources for a Ranging Request (RNG-REQ) message. To accomplish this, the BS may use a Code Division Multiple Access (CDMA) Allocation Information Element (IE) of an Uplink map (UL-MAP) message sent at 704.

At 706, the MS may send a RNG-REQ message to the BS using the allocated uplink resources. The RNG-REQ message may contain a location update request with information about the location of the MS. The BS may use the information in the RNG-REQ message to update the location of the MS. At 708, the BS may send to the MS, a RNG-RSP message including a location update response to indicate that the location update was successful.

This RNG-RSP message may act as a confirmation for the MS that the BS successfully received the DREG-REQ message 420 sent previously. Following the confirmation, the MS may successfully enter idle mode. Since the BS successfully received the DREG-REQ message 420, the BS may be aware of the MS's idle mode entry. Therefore, when there is pending DL traffic directed to the MS, the BS may notify the MS by sending a page message. The MS may periodically wake up and scan for the page message as described earlier.

In the example shown in FIG. 7, the BS successfully received the DREG-REQ message 420 in the first attempt, thereby causing successful idle mode entry by the MS. If, on the other hand, the BS did not successfully receive the DREG-REQ message 420, the MS may not receive a response to the location update request contained in the RNG-REQ message, regardless of whether the BS successfully received the location update request.

Thus, the MS may listen for retransmissions of the DREG-CMD from the BS requesting the MS enter idle mode and repeat the operations described above. As an alternative, or in addition, the MS may repeatedly retransmit the location update request until a maximum limit of retransmissions is reached and conclude that the BS did not successfully receive the DREG-REQ message 420. The MS may then repeat retransmission of the DREG-REQ message 420 followed by the location update procedure as described earlier until the BS indicates successful reception of the message 420, in an effort to avoid loss of synchronization during idle mode.

Figure 6A:
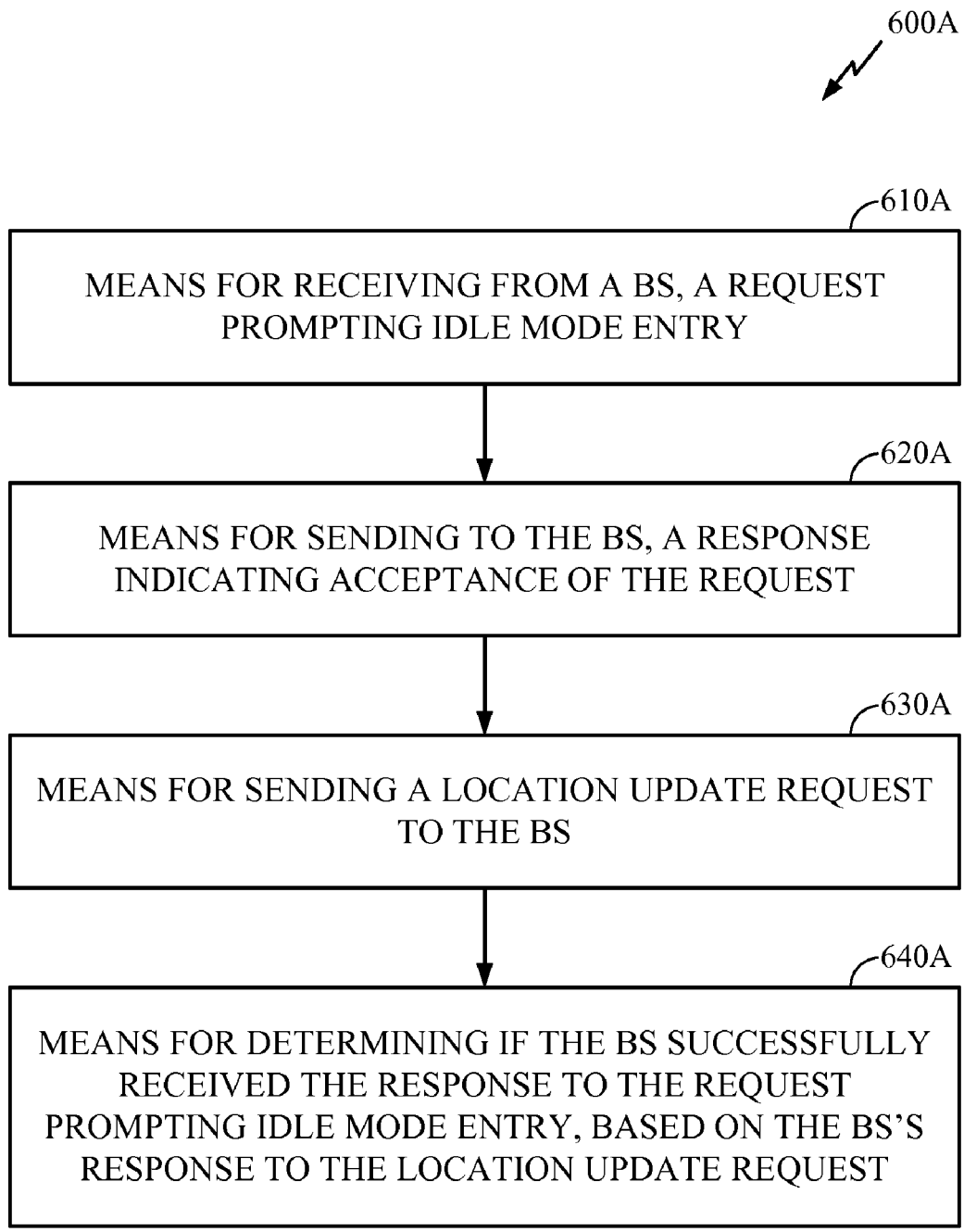
FIG. 6A is a block diagram of means corresponding to the example operations of FIG. 6 in accordance with certain embodiments of the present disclosure.

The operations described above may be performed by various hardware and/or software component(s) and/or module(s) corresponding to a number of means-plus-function blocks. For example, the operations 600 of FIG. 6 described above may be performed by various hardware and/or software component(s) and/or module(s) corresponding to the means-plus-function blocks 600A illustrated in FIG. 6A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
   receiving a request from a base station (BS) to enter idle mode;
   sending a response to the BS indicating acceptance of the request to enter idle mode;
   sending a location update request to the BS to confirm successful receipt of the response by the BS; and
   determining if the response indicating acceptance of the request to enter idle mode was successfully received by the BS, based on a response to the location update request sent by the BS or a lack of response to the location update request sent by the BS.

2. The method of claim 1, further comprising:
   entering the idle mode in response to determining the response indicating acceptance of the request to enter idle mode was successfully received by the BS.

3. The method of claim 1, further comprising:
   repeatedly sending a location update request to the BS to confirm successful receipt of the response by the BS.

4. The method of claim 1, further comprising:
   listening for another request from the BS to enter idle mode in response to determining the response indicating acceptance of the request to enter idle mode was not successfully received by the BS.

5. The method of claim 1, comprising:
   receiving a location update response from the BS indicating a location was successfully updated; and
   in response, entering the idle mode.

6. An apparatus for wireless communications, comprising:
   logic for receiving a request from a base station (BS) to enter idle mode;
   logic for sending a response to the BS indicating acceptance of the request to enter idle mode;

logic for sending a location update request to the BS to confirm successful receipt of the response by the BS; and logic for determining if the response indicating acceptance of the request to enter idle mode was successfully received by the BS, based on a response to the location update request sent by the BS or a lack of response to the location update request sent by the BS.

7. The apparatus of claim 6, further comprising:

logic for entering the idle mode in response to determining the response indicating acceptance of the request to enter idle mode was successfully received by the BS.

8. The apparatus of claim 6, further comprising:

logic for repeatedly sending a location update request to the BS to confirm successful receipt of the response by the BS.

9. The apparatus of claim 6, further comprising:

logic for listening for another request from the BS to enter idle mode in response to determining the response indicating acceptance of the request to enter idle mode was not successfully received by the BS.

10. The apparatus of claim 6, comprising:

logic for receiving a location update response from the BS indicating a location was successfully updated and, in response, entering the idle mode.

11. An apparatus for wireless communications, comprising:

means for receiving a request from a base station (BS) to enter idle mode;

means for sending a response to the BS indicating acceptance of the request to enter idle mode;

means for sending a location update request to the BS to confirm successful receipt of the response by the BS; and means for determining if the response indicating acceptance of the request to enter idle mode was successfully received by the BS, based on a response to the location update request sent by the BS or a lack of response to the location update request sent by the BS.

12. The apparatus of claim 11, further comprising:

means for entering the idle mode in response to determining the response indicating acceptance of the request to enter idle mode was successfully received by the BS.

13. The apparatus of claim 11, further comprising:

means for repeatedly sending a location update request to the BS to confirm successful receipt of the response by the BS.

14. The apparatus of claim 11, further comprising:

means for listening for another request from the BS to enter idle mode in response to determining the response indicating acceptance of the request to enter idle mode was not successfully received by the BS.

15. The apparatus of claim 11, comprising:

means for receiving a location update response from the BS indicating a location was successfully updated and, in response, entering the idle mode.

16. A computer-program product for wireless communications, comprising a non-transitory computer readable medium having instructions stored thereon, the instructions being executable by one or more processors and the instructions comprising:

instructions for receiving a request from a base station (BS) to enter idle mode;

instructions for sending a response to the BS indicating acceptance of the request to enter idle mode;

instructions for sending a location update request to the BS to confirm successful receipt of the response by the BS; and instructions for determining if the response indicating acceptance of the request to enter idle mode was successfully received by the BS, based on a response to the location update request sent by the BS or a lack of response to the location update request sent by the BS.

17. The computer-program product of claim 16, further comprising:

instructions for entering the idle mode in response to determining the response indicating acceptance of the request to enter idle mode was successfully received by the BS.

18. The computer-program product of claim 16, further comprising:

instructions for repeatedly sending a location update request to the BS to confirm successful receipt of the response by the BS.

19. The computer-program product of claim 16, further comprising:

instructions for listening for another request from the BS to enter idle mode in response to determining the response indicating acceptance of the request to enter idle mode was not successfully received by the BS.

20. The computer-program product of claim 16, comprising:

instructions for receiving a location update response from the BS indicating a location was successfully updated, in response, entering the idle mode.

* * * * *